(12) United States Patent
Geshi et al.

(10) Patent No.: US 12,362,422 B2
(45) Date of Patent: Jul. 15, 2025

(54) POWER STORAGE MODULE (71) Applicant: Panasonic Intellectual Property Management Co., Ltd., Osaka (JP)

(72) Inventors: Shinya Geshi, Osaka (JP); Hirotaka Ogino, Osaka (JP); Chifumi Murayama, Osaka (JP); Hiroshi Takasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 554 days.

(21) Appl. No.: 17/635,688

(22) PCT Filed: Aug. 19, 2020

(86) PCT No.: PCT/JP2020/031347
§ 371 (c)(1),
(2) Date: Feb. 15, 2022

(87) PCT Pub. No.: WO2021/039551
PCT Pub. Date: Mar. 4, 2021

(65) Prior Publication Data
US 2022/0285775 A1 Sep. 8, 2022

(30) Foreign Application Priority Data
Aug. 30, 2019 (JP) ................. 2019-158693

(51) Int. Cl.
H01M 50/244 (2021.01)
H01M 50/186 (2021.01)
H01M 50/213 (2021.01)
H01M 50/218 (2021.01)
H01M 50/24 (2021.01)
H01M 50/242 (2021.01)

(52) U.S. Cl.
CPC ....... *H01M 50/244* (2021.01); *H01M 50/186* (2021.01); *H01M 50/213* (2021.01); *H01M 50/218* (2021.01); *H01M 50/24* (2021.01); *H01M 50/242* (2021.01)

(58) Field of Classification Search
CPC ............ H01M 50/244; H01M 50/186; H01M 50/213; H01M 50/218; H01M 50/24; H01M 50/242; H01M 50/184; H01M 50/107; H01M 50/264; H01G 11/78; H01G 2/06; H01G 11/10; H01G 11/76; H01G 11/82; Y02E 60/10; Y02T 10/70
See application file for complete search history.

(56) References Cited

U.S. PATENT DOCUMENTS

| | | | |
|---|---|---|---|
| 6,379,837 B1 * | 4/2002 | Takahashi | H01M 50/296 429/151 |
| 2005/0153194 A1 | 7/2005 | Kimura et al. | |
| 2010/0015512 A1 | 1/2010 | Inoue et al. | |
| 2015/0072217 A1 | 3/2015 | Kim et al. | |
| 2015/0340666 A1 | 11/2015 | Kang et al. | |
| 2017/0047566 A1 | 2/2017 | Okuda et al. | |
| 2020/0136110 A1 | 4/2020 | Koutari et al. | |
| 2020/0335740 A1 * | 10/2020 | Stanger | H01M 50/213 |

FOREIGN PATENT DOCUMENTS

| | | |
|---|---|---|
| CA | 2814886 A1 | 5/2012 |
| EP | 1030387 A1 | 8/2000 |
| JP | 2003-229166 A | 8/2003 |
| JP | 2004-178831 A | 6/2004 |
| JP | 2008-123758 A | 5/2008 |
| JP | 2009-188095 A | 8/2009 |
| JP | 2010-009798 A | 1/2010 |
| JP | 2013-543239 A | 11/2013 |
| JP | 5512446 B | 6/2014 |
| JP | 2015-201290 A | 11/2015 |
| JP | 2016-505205 A | 2/2016 |
| JP | 2019-083087 A | 5/2019 |
| WO | 2008/099602 A1 | 8/2008 |
| WO | 2012/046711 A1 | 4/2012 |
| WO | 2016/009586 A1 | 1/2016 |
| WO | 2018/225609 A1 | 12/2018 |

OTHER PUBLICATIONS

International Search Report of PCT application No. PCT/JP2020/031347 dated Oct. 13, 2020.
EPC Office Action dated Nov. 2, 2022 for the related European Patent Application No. 20858651.1.

* cited by examiner

*Primary Examiner* — Muhammad S Siddiquee
(74) *Attorney, Agent, or Firm* — Rimon P.C.

(57) ABSTRACT

A power storage module includes at least one cylindrical power storage device, and a lower holder that holds a lower end part of the power storage device, wherein at least one concave part is formed on one of a surface of the power storage device facing a holding part and a surface of the holding part facing the power storage device, and at least one convex part fitted in the concave part is formed on the other.

18 Claims, 5 Drawing Sheets

POWER STORAGE MODULE

TECHNICAL FIELD

The present disclosure relates to a power storage module including at least one power storage device.

BACKGROUND ART

Conventionally, a power storage module including at least one power storage device is widely known. For example, PTL 1 discloses a power storage module molded by filling resin between a plurality of power storage devices.

CITATION LIST

Patent Literature

PTL 1: Japanese Patent No. 5512446

SUMMARY OF THE INVENTION

A power storage module including a plurality of power storage devices may be used as a power source for power. A power storage module used as a power source for power is used in an environment where vibration is generated for a long time, and it is a problem to secure reliability of fixing of the power storage devices.

An object of the present disclosure is to provide a power storage module capable of firmly fixing a power storage device in a holder.

A power storage module according to one aspect of the present disclosure includes at least one cylindrical power storage device, and a first holder that holds one end of the power storage device, wherein at least one concave part is formed on one of a surface of the power storage device facing the first holder and a surface of the first holder facing the power storage device, and at least one convex part fitted in the concave part is formed on the other.

According to one aspect of the present disclosure, it is possible to provide the power storage module capable of firmly fixing the power storage device in the holder.

DESCRIPTION OF EMBODIMENT

Hereinafter, exemplary embodiments of the present disclosure will be described with reference to the drawings. The shape, material, and number described below are examples for description, and can be appropriately changed according to the specification of the power storage module. In the following description, the same elements are denoted by the same reference marks in all the drawings.

Figure 1:
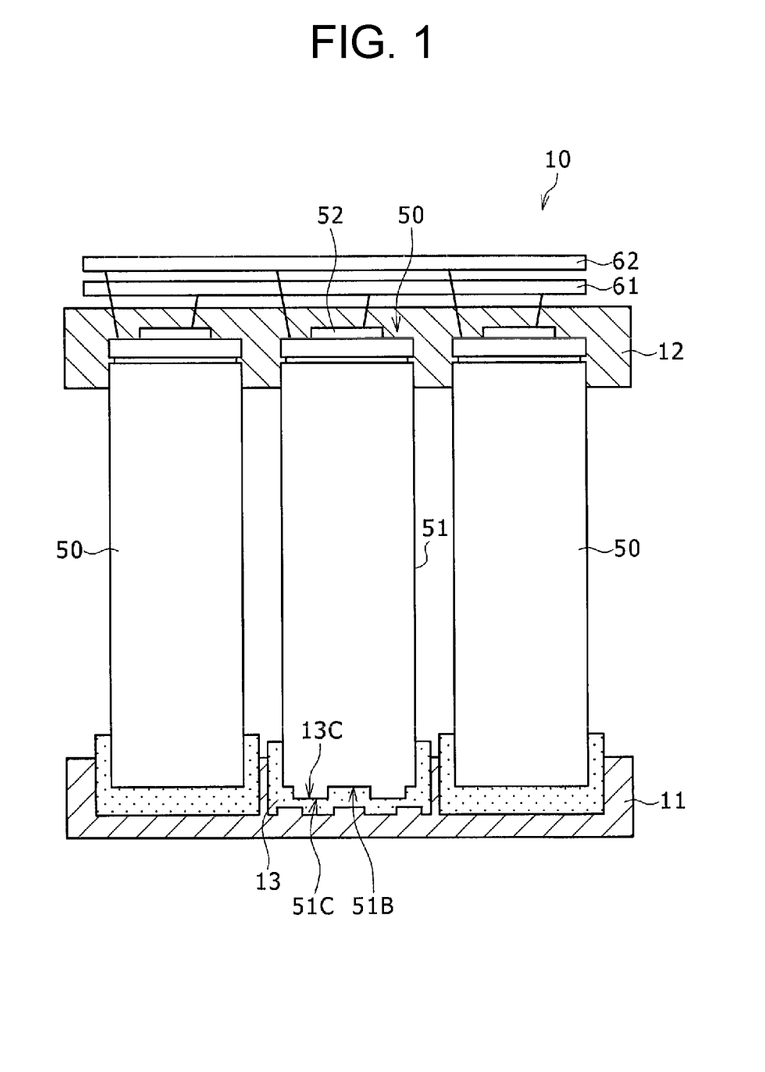
FIG. 1 is a schematic view illustrating a power storage module of a first exemplary embodiment.

Power storage module 10 of a first exemplary embodiment will be described with reference to FIG. 1. FIG. 1 is a schematic view illustrating power storage module 10.

Power storage module 10 is mainly used as a power source for power. Power storage module 10 is used as a power source of an electrically powered device driven by a motor such as an electrically powered tool, an electrically powered automobile, an electrically powered assist bicycle, an electrically powered motorcycle, an electrically powered wheelchair, an electrically powered tricycle, or an electrically powered cart, for example. However, the application of power storage module 10 is not specified, and the power storage module may be used as a power source for various electric devices used indoors and outdoors, such as electric devices other than electrically powered devices, for example, cleaners, wireless devices, lighting devices, digital cameras, and video cameras.

Power storage module 10 of the first exemplary embodiment includes a plurality of cylindrical power storage devices 50, lower holder 11 as a first holder that holds lower end parts of the plurality of power storage devices 50, and upper holder 12 as a second holder that holds upper end parts of the plurality of power storage devices 50. Holding part 13 is provided between power storage device 50 and lower holder 11. Note that the first holder may include holding part 13.

As power storage device 50, a cylindrical lithium ion secondary battery is used. Power storage device 50 may be a nickel-metal hydride storage or a capacitor. The plurality of power storage devices 50 are densely filled in power storage module 10, and adjacent power storage devices 50 are arranged substantially close to each other. Power storage device 50 includes electrode assembly 55 including a positive electrode and a negative electrode, exterior can 51 as a case having a cylindrical cylinder part, bottom part 51B formed at a lower end of the cylinder part, and an opening part formed at an upper end, and sealing body 52 that seals the opening part of exterior can 51 in a state of being insulated from exterior can 51. In power storage device 50, the positive electrode of the electrode assembly and sealing body 52 are electrically connected to each other, and the negative electrode and exterior can 51 are electrically connected to each other. In power storage device 50, a top plate of sealing body 52 is configured as a positive-electrode terminal. In power storage device 50, exterior can 51 is configured as a negative-electrode terminal.

Upper holder 12 holds upper end parts of the plurality of power storage devices 50, respectively. On a lower surface part of upper holder 12, containers in which the upper end parts of power storage devices 50 are housed are formed. Upper holder 12 is made of a thermoplastic resin, a thermosetting resin, or the like, which is an insulating material. An opening part may be formed in each of the containers of upper holder 12, and the positive-electrode terminal and the negative-electrode terminal may be exposed.

Positive electrode current collecting member 61 connected to the positive-electrode terminal is disposed above upper holder 12. Negative electrode current collecting member 62 connected to the negative-electrode terminal is disposed above upper holder 12. As positive electrode current collecting member 61 and negative electrode current collecting member 62, a material having good electric conduction and thermal conduction is used, and an iron plate whose surface is plated with nickel or the like, a metal plate such as a nickel plate, a copper plate, or an aluminum plate is preferably used. Note that positive electrode current collecting member 61 and negative electrode current collecting member 62 are disposed so as to overlap each other as illustrated in FIG. 1, but are not limited to this configuration. For example, a plurality of current collecting members may be disposed on upper holder 12 at predetermined intervals, and the current collecting members may be connected in parallel or in series to the plurality of power storage devices 50.

Lower holder 11 holds lower end parts of the plurality of power storage devices 50, respectively. On an upper surface part of lower holder 11, containers in which the lower end parts of power storage devices 50 are housed are formed. Lower holder 11 is made of a thermoplastic resin, a thermosetting resin, or the like, which is an insulating material. Holding part 13 is provided between each of the containers of lower holder 11 and the lower end part of power storage device 50.

Holding part 13 is filled between power storage device 50 and lower holder 11. As holding part 13, an epoxy-based adhesive, a silicone-based elastic adhesive, or the like is preferably used. The epoxy-based adhesive is an adhesive using a resin having an epoxy group (oxirane ring). The epoxy-based adhesive is generally a two-component adhesive, and a main component thereof is a substance containing an epoxy group. The epoxy-based adhesive is also in the form of an amine, an ether, or an ester containing an epoxy group as a hardener, and becomes an epoxy-based adhesive by a chemical reaction started by mixing two components. On the other hand, the elastic adhesive is an adhesive in which a cured product after curing is a rubber-like elastic body.

Furthermore, a potting material can also be used as holding part 13. As the potting material, a transparent polyurethane resin obtained by chemically reacting two liquids of a polyol as a main agent and an isocyanate as a hardener is preferably used. Protective material B is not limited to a polyurethane resin, and a urethane resin, an epoxy resin, an acrylic resin, a UV curable resin, or the like may be used. In particular, when a material having rigidity is used as the holding part after the power storage module such as a potting material is produced, only the holding part may be used as the lower holder.

In exterior can 51 constituting power storage device 50, a concave shape or a convex shape is formed on a surface facing holding part 13. In exterior can 51 exemplified in FIG. 1, convex part 51C is formed on bottom part 51B of exterior can 51.

In holding part 13, a concave shape or a convex shape is formed in a part facing bottom part 51B of exterior can 51. When a convex shape is formed in exterior can 51, a concave shape is formed in holding part 13. When a concave shape is formed in exterior can 51, a convex shape is formed in holding part 13. The convex shape or the concave shape formed in exterior can 51 and the convex shape or the concave shape formed in holding part 13 are formed so as to be fitted to each other. Similarly to exterior can 51, a convex shape or a concave shape may also be provided on a surface of lower holder 11 facing holding part 13 to increase fixing strength of holding part 13 to lower holder 11. At this time, the convex part or the concave part of exterior can 51 and the convex shape or the concave shape of lower holder 11 may not face each other. A convex shape may be formed in exterior can 51, and a convex shape may also be formed in lower holder 11.

Figure 2:
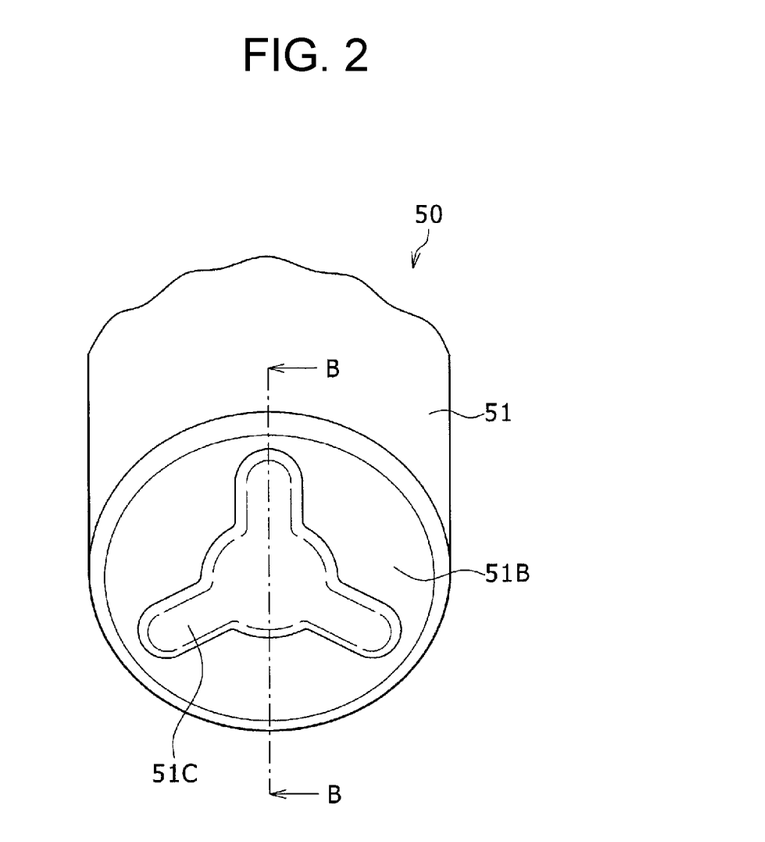
FIG. 2 is a perspective view illustrating an example of a convex part formed on a bottom part of a power storage device of the first exemplary embodiment.

An example of convex part 51C will be described with reference to FIG. 2. FIG. 2 is a perspective view illustrating bottom part 51B of exterior can 51 in which convex part 51C is formed.

As described above, in power storage device 50, convex part 51C is formed on bottom part 51B of exterior can 51. A side peripheral surface of convex part 51C exemplified in FIG. 2 is formed in a non-annular shape. Specifically, convex part 51C has a shape in which a substantially circular shape and a long circular shape protruding at an interval of 120° from an outer side of the substantially circular shape are integrated in a plan view. Note that, as described above, in holding part 13, concave part 13C that fits with convex part 51C illustrated in FIG. 2 is formed on a surface facing bottom part 51B of exterior can 51. Note that the lower end surface of the convex part 51C may be polygonal.

Effects of convex part 51C and concave part 13C will be described. According to convex part 51C and concave part 13C, convex part 51C and concave part 13C act as an anchor effect on holding part 13. The anchor effect is an effect of increasing a fixing force by holding part 13 entering the irregularities of a material surface like a tree root and curing in the fixing. This is because a fixing force is increased by friction or the like due to an increase in a contact area between exterior can 51 and holding part 13, and convex part 51C and concave part 13C serve as wedges when power storage device 50 is about to rotate in holding part 13 (eventually, lower holder 11). With such a configuration, position regulation between bottom part 51B of exterior can 51 and holding part 13 (furthermore, lower holder 11) becomes easy. That is, power storage device 50 and holding part 13 can be further strengthened. In particular, when holding part 13 (lower holder 11 directly abutting on exterior can 51 when holding part 13 is not provided) is molded by impregnating power storage device 50 with a viscous material and then curing the viscous material, it is difficult to arrange a member for fixing power storage device 50 such as an adhesive between molded holding part 13 and exterior can 51. Therefore, the fixing force of power storage device 50 in lower holder 11 (including holding part 13) can be increased by a simple operation.

Convex part 51C formed on bottom part 51B of exterior can 51, and concave part 13C formed on holding part 13 and locked to convex part 51C particularly act as an anchor effect against vibration in a rotation direction of power storage device 50 in lower holder 11. In the convex part (or the concave part) formed on exterior can 51 of the present disclosure, reliability of alignment in a height with respect to holding part 13 (eventually, lower holder 11) may be enhanced by further forming a convex part or a concave part on an outer peripheral surface (an inner peripheral surface in the case of a concave part) of the convex part.

For example, a convex shape may be formed in a part facing holding part 13 on a side circumferential surface of exterior can 51. In this case, in holding part 13, a concave shape is formed in a part facing the side peripheral surface of exterior can 51. Also in this case, the convex shape of exterior can 51 and the concave shape of holding part 13 are fitted to each other. With such a configuration, the convex part formed on the side circumferential surface of exterior can 51 and the concave part formed on holding part 13 and fitted to the convex part act as an anchor effect on vibration of power storage device 50 in a vertical direction particularly in lower holder 11.

Figure 3:
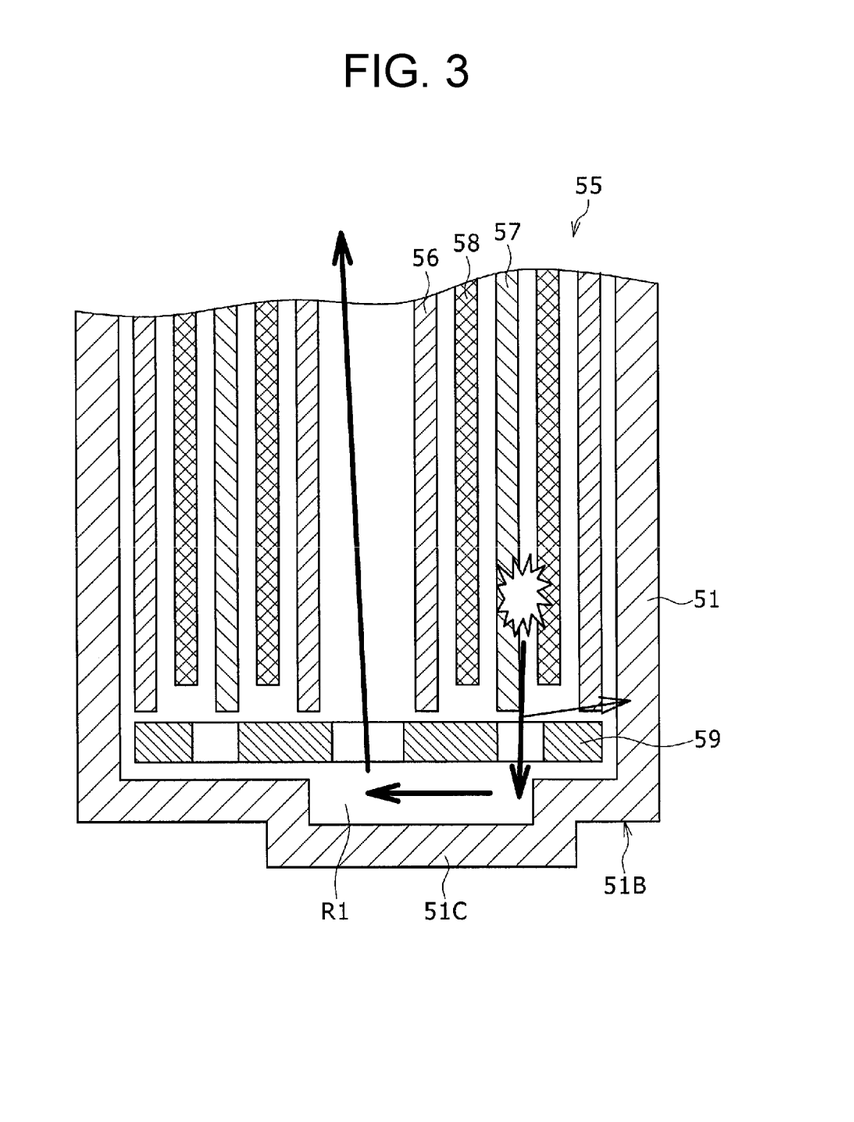
FIG. 3 is a schematic view illustrating an exhaust action of a high-temperature gas of the power storage device of the first exemplary embodiment.

With reference to FIG. 3, an exhaust action of a high-temperature gas of power storage device 50 will be described. FIG. 3 is a schematic view illustrating a cross section of power storage device 50 using exterior can 51 of FIG. 2 taken along cutting line BB.

Electrode assembly 55 and electrolyte solution are accommodated in power storage device 50. Electrode assembly 55 includes positive electrode 56, negative electrode 57, and separator 58 interposed between positive electrode 56 and negative electrode 57, and has a wound structure in which positive electrode 56 and negative electrode 57 are wound with separator 58 interposed therebetween. Insulating plate 59 is disposed below electrode assembly 55.

In power storage device 50, in an abnormal state, for example, when positive electrode 56 and negative electrode 57 are short-circuited, a very large current flows in a short-circuited part and large heat is generated, and then positive electrode 56 or negative electrode 57 and the electrolytic solution react with each other to generate a high-temperature gas.

As described above, in power storage device 50, convex part 51C is formed on bottom part 51B of exterior can 51. An inner surface of bottom part 51B exemplified in FIG. 3 is formed by recessing a part corresponding to convex part 51C. Convex part 51C of bottom part 51B exemplified in FIG. 3 extends in a radial direction of bottom part 51B.

In power storage device 50 exemplified in FIG. 3, as compared with power storage device 50 in which a solid convex part is formed in exterior can 51, the high-temperature gas generated in exterior can 51 passes through space R1 formed close to an inner surface side of convex part 51C, and is discharged from a space formed in a shaft part of electrode assembly 55 to an upper part of exterior can 51. The high-temperature gas is released to an outside by breaking a part of sealing body 52. Accordingly, when the high-temperature gas is generated inside power storage device 50 at the time of abnormality, the high-temperature gas is smoothly discharged from power storage device 50. At this time, when convex part 51C forming space R1 has a region overlapping with the center of bottom part 51B of exterior can 51 as illustrated in FIGS. 2 and 3, the exhaust efficiency is further enhanced. It is considered that a similar effect can be obtained even when a concave part having an anchor effect on holding part 13 is formed in the bottom part of exterior can 51 and the concave part is formed to extend in the radial direction of the bottom part.

Figure 4:
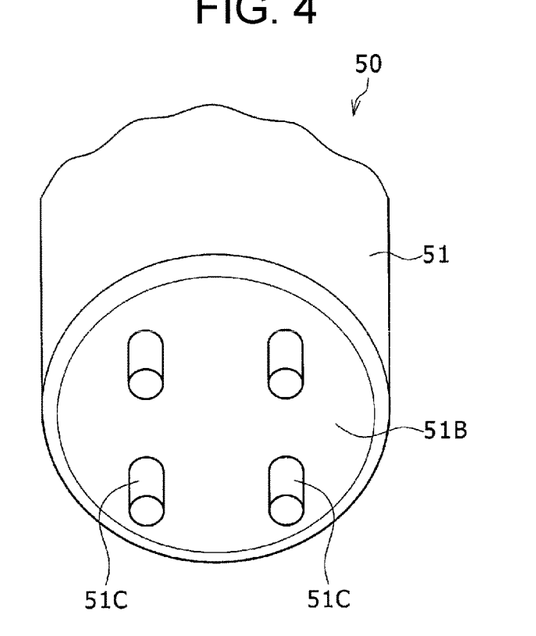
FIG. 4 is a perspective view illustrating another example of the convex part formed on the bottom part of the power storage device of the first exemplary embodiment.

Another example of convex part 51C will be described with reference to FIG. 4. FIG. 4 is a perspective view illustrating bottom part 51B of exterior can 51 in which convex part 51C is formed.

A plurality of (in the drawings, for example, four) convex parts 51C are formed. Convex part 51C has a substantially cylindrical shape. Furthermore, convex parts 51C are disposed at positions not overlapping with central axis P of exterior can 51 in bottom part 51B. Note that, as described above, in holding part 13, only a plurality of concave parts 13C to be fitted to convex parts 51C are formed on a surface facing bottom part 51B of exterior can 51 (not illustrated).

According to convex part 51C and concave part 13C of such another example, convex part 51C and concave part 13C act as an anchor effect on holding part 13. With such a configuration, it is possible to facilitate alignment between bottom part 51B of exterior can 51 and lower holder 11. That is, it is possible to firmly fix power storage device 50 and holding part 13 and hence lower holder 11.

Figure 5:
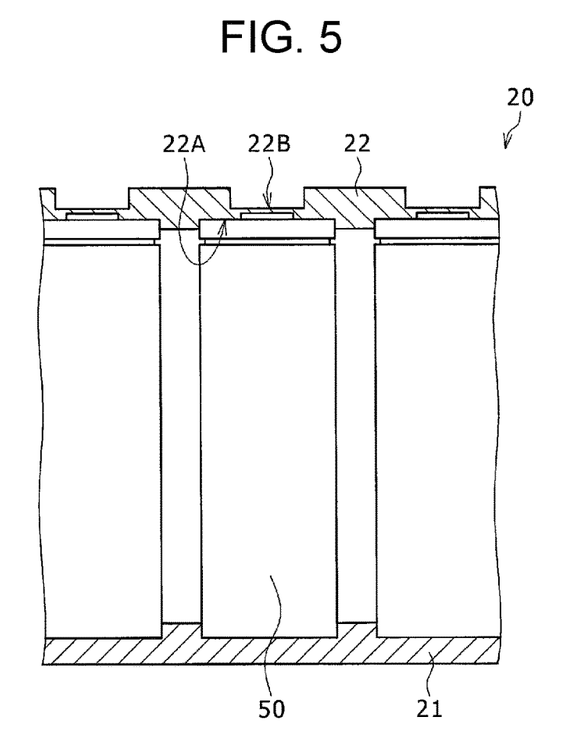
FIG. 5 is a schematic view illustrating a power storage module of a second exemplary embodiment.

Power storage module 20 of a second exemplary embodiment will be described with reference to FIG. 5. FIG. 5 is a schematic view illustrating power storage module 20.

Power storage module 20 of the second exemplary embodiment includes the plurality of cylindrical power storage devices 50, lower holder 21 as a first holder that holds lower end parts of the plurality of power storage devices 50, respectively, and upper holder 22 as a second holder that holds upper end parts of the plurality of power storage devices 50, respectively. Since power storage device 50 has the same configuration as power storage device 50 of the first exemplary embodiment described above, the description thereof is omitted.

Upper holder 22 is molded by curing a potting material, and holds the upper end parts of the plurality of power storage devices 50, respectively. On a lower surface part of upper holder 22, containers 22A to which an upper end part of the power storage device 50 is fitted are formed. In container 22A, a part facing sealing body 52 of power storage device 50 is defined as thin part 22B. Thin part 22B is formed to have a sufficiently smaller thickness than other parts of container 22A. Thin part 22B is preferably 2 mm or less, for example.

Note that, when thin part 22B is formed in upper holder 22, by filling a potting material in a state where a rod is disposed at a position facing sealing body 52 of power storage device 50 at a predetermined interval and curing the potting material and then removing the rod when upper holder 22 is manufactured, thin part 22B having the thickness of a dimension of the above-described interval is formed. Note that, when positive electrode current collecting member 61 and negative electrode current collecting member 62 are disposed on the upper part of upper holder 22, upper holder 22 is manufactured after these current collecting members and the plurality of power storage devices 50 are joined to each other.

When power storage device 50 is in a normal state, thin part 22B can cover power storage device 50, so that insulation from the outside of the module of power storage device 50 can be achieved. Furthermore, it is possible to suppress entry of a foreign matter into the container and hence into the power storage device. Further, when an exhaust valve is provided in sealing body 52 and power storage device 50 is in an abnormal state, thin part 22B can be destroyed by a jetting force of the high-temperature gas discharged from the exhaust valve when the exhaust valve is activated, and can be exhausted to the outside of the power storage module.

Figure 6:
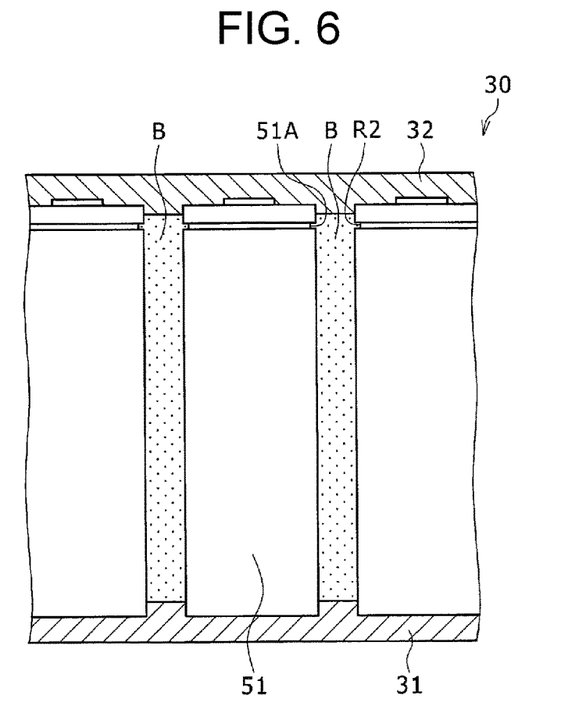
FIG. 6 is a schematic view illustrating a power storage module of a third exemplary embodiment.

Power storage module 30 of a third exemplary embodiment will be described with reference to FIG. 6. FIG. 6 is a schematic view illustrating power storage module 30.

Power storage module 30 of the third exemplary embodiment includes a plurality of cylindrical power storage devices 50, lower holder 31 as a first holder that holds lower end parts of the plurality of power storage devices 50, respectively, and upper holder 32 as a second holder that holds upper end parts of the plurality of power storage devices 50, respectively. In power storage module 30, a gap between adjacent power storage devices 50 is filled with protective material B as potting.

Power storage device 50 includes exterior can 51 as a case having a cylindrical part, bottom part 51B formed at a lower end of the cylindrical part and an opening part formed at an upper end, and sealing body 52 for sealing the opening part. Exterior can 51 includes, for example, grooved part 51A that supports sealing body 52 and is formed by rolling a side surface part from the outside. Grooved part 51A is preferably formed in an annular shape in a circumferential direction of exterior can 51, and sealing body 52 is supported by an upper surface of the grooved part. Protective material B filled in the gap between adjacent power storage devices 50 flows into grooved part 51A.

As protective material B used for potting, a transparent polyurethane resin obtained by chemically reacting two liquids of a polyol as a main agent and an isocyanate as a hardener is preferably used. Protective material B is not limited to a polyurethane resin, and a urethane resin, an epoxy resin, an acrylic resin, or the like may be used.

Effects of power storage module 30 of the third exemplary embodiment will be described. According to power storage module 30, power storage device 50 can be firmly fixed. That is, protective material B flows into space R2 and grooved part 51A as an adhesive, and acts as an anchor effect. Accordingly, power storage device 50 can be firmly fixed to upper holder 32.

Figure 7:
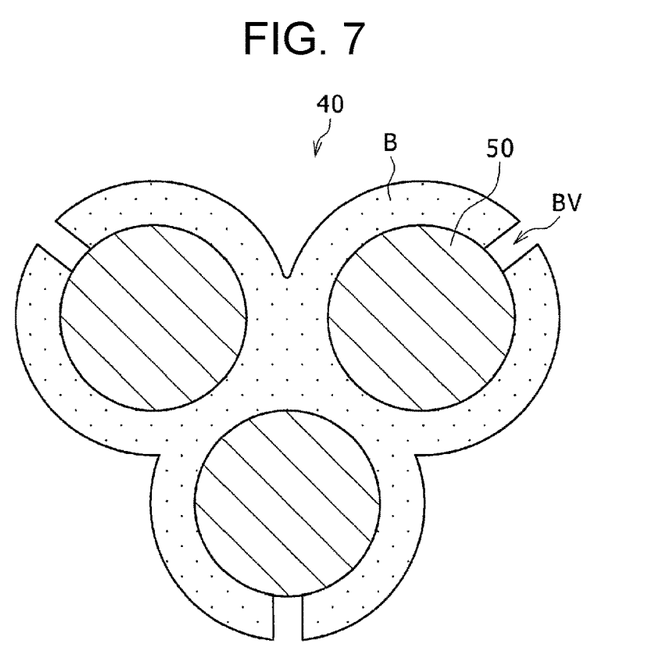
FIG. 7 is a schematic view illustrating a power storage module of a fourth exemplary embodiment.

Power storage module 40 of a fourth exemplary embodiment will be described with reference to FIG. 7. FIG. 7 is a plan cross-sectional view illustrating power storage module 40.

Power storage module 40 of the fourth exemplary embodiment includes a plurality of (three in the exemplification of FIG. 7) cylindrical power storage devices 50, a lower holder (not illustrated) as a first holder that holds lower end parts of the plurality of power storage devices 50, respectively, and upper holder 42 (not illustrated) as a second holder that holds upper end parts of the plurality of power storage devices 50, respectively. Furthermore, in power storage module 40, a gap between adjacent power storage devices 50 is filled with protective material B as potting. Since power storage device 50 and protective material B have the same configurations as those of power storage device 50 of the first exemplary embodiment described above, the description thereof is omitted.

In upper holder 42, container 42A to which the upper end part of power storage device 50 is fitted is formed. In container 42A, opening part 42C through which a part of sealing body 52 is exposed, and cutout part 42D through which a side peripheral surface of power storage device 50 is exposed are formed. Cutout part 42D is provided at a position not interposed between a pair of adjacent batteries in plan view.

In a gap between adjacent power storage devices 50, gap BV not filled with protective material B is formed in a vertical direction along the side peripheral surface of power storage device 50 below cutout part 42D. Gap BV is formed to communicate with cutout part 42D. As a method of forming gap BV, for example, gap BV may be formed by inserting a rod-like jig into a part where gap BV is formed when protective material B is filled, and removing the jig after protective material B is cured.

In power storage device 50, thermal runaway in which a high-temperature gas is released by breaking exterior can 51 may occur. According to power storage module 40, even when thermal runaway occurs in one power storage device 50, the high-temperature gas breaks the outer peripheral surface of exterior can 51 exposed from brittle cutout part 42D having a low heat capacity, and is directed to the outside, so that it is possible to suppress an adverse effect caused by the high-temperature gas on power storage device 50 adjacent to one power storage device 50 in which the thermal runaway has occurred.

Note that the present invention is not limited to the above-described exemplary embodiments and modifications thereof, and it is a matter of course that various changes and improvements can be made within the scope of the matters described in the claims of the present application.

REFERENCE MARKS IN THE DRAWINGS 10 power storage module
11 lower holder
13C concave part
12 upper holder
13 holding part
50 power storage device
51 exterior can
51A grooved part
51B bottom part
51C convex part
52 sealing body
55 electrode assembly
56 positive electrode
57 negative electrode
58 separator
59 insulating plate
61 positive electrode current collecting member
62 negative electrode current collecting member

The invention claimed is:

1. A power storage module comprising:
   a plurality of power storage devices arranged in a first direction, each of the plurality of power storage devices comprises a cylindrical shape; and
   a first holder that holds one end part of the plurality of power storage devices in a second direction perpendicular to the first direction, and is made of an insulating material, wherein:
   power storage device includes a concave part is formed on one of an end surface of each of the plurality of power storage devices in the second direction or a surface of the first holder facing each of the plurality of power storage devices, and a concave part is formed on another of the end surface of each of the plurality of power storage devices in the second direction or the surface of the first holder facing each of the plurality of power storage devices, such that the convex part is fitted in the concave part,
   the convex part includes a surface crossing a line extending in a peripheral direction of each of the plurality of power storage devices, and
   the power storage module further comprises a current collector electrically connecting the plurality of power storage devices and is provided at another end part of the plurality of power storage device opposite to the one end part in the second direction.

2. The power storage module according to claim 1, wherein:
   each of the plurality of power storage devices includes a case including a cylinder part having a cylindrical shape, a bottom part provided at one end part of the cylinder part and an opening part provided at the other end, and a sealing member that seals the opening part, and
   the first holder covers an outer peripheral surface of the cylinder part and the bottom part.

3. The power storage module according to claim 2, wherein the bottom part includes the convex part.

4. The power storage module according to claim 3, wherein the convex part includes a side peripheral surface that is non-annular.

5. The power storage module according to claim 3, wherein a part of an inner surface of the bottom part corresponding to the convex part is recessed, and the convex part extends in a radial direction of the bottom part.

6. The power storage module according to claim 3, wherein the bottom part includes a plurality of convex parts each corresponding to the convex part.

7. The power storage module according to claim 6, wherein the convex parts are disposed at positions not overlapping with a central axis of the case at the bottom part.

8. The power storage module according to claim 2, further comprising a second holder that covers the sealing member and is located opposite to the first holder in an extending direction of each of the plurality of power storage devices,
wherein at least a part of a part of the second holder facing the sealing member has a thickness smaller than a thickness of a remaining part of the second holder.

9. The power storage module according to claim 1, wherein;
a protective material is filled in a gap between adjacent ones of the plurality of power storage devices and then is cured,
an upper end part of each of the plurality of power storage devices includes a groove along peripheral, and
the protective material flows into the groove and is cured.

10. The power storage module according to claim 1, wherein
a protective material is filled in a gap between adjacent ones of the plurality of power storage devices and then is cured,
the protective material includes a cutout part that exposes a side peripheral surface of each of the plurality of power storage devices, and
the cutout part is at a position where the cutout part is not interposed between adjacent one of the plurality of power storage devices.

11. The power storage module according to claim 1, wherein
the first holder includes a cutout part that exposes a side peripheral surface of each of the plurality of power storage devices, and
the cutout part is at a position where the cutout part is not interposed between adjacent ones of the plurality of power storage devices.

12. The power storage module according to claim 1, wherein the first holder is obtained by impregnating the plurality of power storage devices with a material including viscosity and curing the material.

13. The power storage module according to claim 9, wherein:
an upper end part of the cylinder part of the case includes an annular groove, and
the protective material enters into the groove.

14. The power storage module according to claim 2, wherein the bottom part includes only one convex part.

15. The power storage module according to claim 2, wherein the convex part overlaps with a central axis of the case at the bottom part.

16. The power storage module according to claim 15, wherein the convex part comprises a center circular part and a plurality of extension parts extending from the center circular part.

17. The power storage module according to claim 1, wherein:
the first holder includes:
a lower holder that is made of a first material and holds the power storage device; and
a holding part that is made of a second material and is provided between the power storage device and the lower holder, and
the holding part includes the concave part and covers the part of the outer peripheral surface and bottom part of the cylinder part.

18. The power storage module according to claim 17, wherein the holding part is made of a cured resin.

* * * * *